(12) United States Patent
Cao

(10) Patent No.: US 8,120,347 B1
(45) Date of Patent: Feb. 21, 2012

(54) SAMPLE AND HOLD CIRCUIT AND METHOD FOR MAINTAINING UNITY POWER FACTOR

(76) Inventor: Huyvu Cao, Fountain Valley, CA (US)

( * ) Notice: Subject to any disclaimer, the term of this patent is extended or adjusted under 35 U.S.C. 154(b) by 329 days.

(21) Appl. No.: 12/592,839

(22) Filed: Dec. 2, 2009

(51) Int. Cl.
*G05F 1/40* (2006.01)

(52) U.S. Cl. .......................... 323/285; 323/284; 323/222

(58) Field of Classification Search .................. 323/222, 323/282–285, 288, 290, 351
See application file for complete search history.

(56) References Cited

U.S. PATENT DOCUMENTS

| | | | |
|---|---|---|---|
| 4,356,440 A | 10/1982 | Curtiss et al. | |
| 5,006,975 A | 4/1991 | Neufeld | |
| 5,619,405 A | 4/1997 | Kammiller et al. | |
| 5,631,550 A | 5/1997 | Castro et al. | |
| 6,297,980 B1 | 10/2001 | Smedley et al. | |
| 6,756,771 B1 | 6/2004 | Ball et al. | |
| 6,781,352 B2 | 8/2004 | Athari et al. | |
| 6,930,474 B2 * | 8/2005 | Wang | 323/288 |
| 7,149,097 B1 | 12/2006 | Shteynberg et al. | |
| 7,164,591 B2 | 1/2007 | Soldano | |
| 7,230,406 B2 * | 6/2007 | Huang et al. | 323/222 |
| 7,315,150 B1 | 1/2008 | Coleman | |
| 7,359,224 B2 | 4/2008 | Li | |
| 7,397,678 B2 | 7/2008 | Frank et al. | |
| 7,456,621 B2 | 11/2008 | Leung et al. | |
| 2005/0212501 A1 | 9/2005 | Acatrinei | |
| 2008/0002439 A1 | 1/2008 | Allinder | |

* cited by examiner

*Primary Examiner* — Jessica Han
(74) *Attorney, Agent, or Firm* — Gene Scott; Patent Law & Venture Group

(57) ABSTRACT

An AC electrical system has a source voltage and current interconnected through an energy storage device with a load. A unity power factor control circuit maintains unity power factor incorporating the steps of producing a sample and hold voltage related to the input voltage and an output voltage where the sample and hold voltage maintains constant values between pulses of a clock signal. A modulated signal at each clock pulse fall produces a current feedback voltage proportional to the source current, and as long as it is less then the sample and hold voltage, an inductor stores energy, and delivers it to the load each time the feedback voltage exceeds the sample and hold voltage and energy stored in the inductor is thereby delivered to the load, whereby controlling the amount of energy stored, the input voltage and current are drawn into phase thereby maintaining unity power factor.

17 Claims, 6 Drawing Sheets

SAMPLE AND HOLD CIRCUIT AND METHOD FOR MAINTAINING UNITY POWER FACTOR

BACKGROUND OF THE INVENTION

1. Field of the Present Disclosure

This disclosure relates generally to the field of electric power distribution and, in particular, to power factor correction in single phase and multi-phase systems using a sample and hold technique.

2. Description of Related Art including information disclosed under 37 CFR 1.97 and 1.98

Neufeld, U.S. Pat. No. 5,006,975, discloses a power factor correction circuit in which a divided-down version of a rectified input waveform is sampled approximately at its peak by a sample-and-hold circuit. The peak value is then processed to produce a correction signal which is subtracted from the original divided down rectified signal. This produces a reference signal which is then multiplied by the output of an error amplifier to produce a sinusoidal reference signal for the input current. The output of the error amplifier which is used is that which is sampled periodically when the divided-down rectified signal approaches zero volts. The sinusoidal reference is used by peak and valley comparators whose other inputs come from a current sense amplifier. The outputs of the comparators are used to switch a shunting transistor which controls the input current to achieve near unit y power factor.

Kammiller et al, U.S. Pat. No. 5,619,405, discloses a regulated power supply having power factor correction control which includes a state variable integrator/error amplifier that provides a low distortion error signal during steady state operation and fast transient response for tight output voltage control.

Curtiss et al, U.S. Pat. No. 4,356,440, discloses a discrete-time, closed loop power factor corrector system controlling the coupling of a delta-connected switched capacitor array to a 3- or 4-wire power line which may have time-varying, unbalanced, inductive loads. For inductive loads that cannot be exactly compensated with a delta-connected capacitance, the corrector system minimizes the total RMS reactive current drawn from the power line.

Ball et al, U.S. Pat. No. 6,756,771, discloses a power factor correction device which stores the output of an error amplifier on a storage element. A zero crossing detector detects the zero crossings of the AC input voltage and enables the power factor correction device to adjust the value of the voltage stored on the storage element.

Bridgeman, U.S. Pat. No. 6,147,475, discloses a method for predicting harmonic-distortion values for the application of a desired step change of capacitance to an AC system, an initial step change is applied and, from this change, and a value of harmonic impedance of the system for each of a number of harmonics is determined. From these harmonic-impedance values corresponding values of damping resistance are, in turn, determined and, using the determined harmonic-impedance and damping-resistance values, corresponding values of an electrical load parameter, preferably load voltage, are determined for the desired step capacitance change. The method is conveniently extended to cover a method and apparatus for applying power-factor correction capacitance, in which the load-voltage values for the various harmonics are evaluated to see if they represent a potential resonance condition and, if so, a step change other than the desired change is applied. Where no resonance is indicated, the originally intended step change is applied.

Allinder, U.S. Pat. No. 7,400,517, discloses a power factor correction circuit configured to use a stored value of a feedback signal to assist in regulating the value of an output voltage and to bypass the sample and hold circuit if the output voltage increase to an upper limit or decreases to a lower limit.

Coleman, U.S. Pat. No. 7,315,150, discloses a ripple current mode power converter comprised of a magnetic energy storage element, and a method of determining magnetic storage element charge duration based on periodic magnetic storage element current samples. In the preferred embodiment a controller processes a magnetic storage element ripple current, and average sampled current, to achieve high power factor forgoing the need to sense the AC signal current and voltage levels. The controller element periodically calculates the magnetic storage element charge duration to control the state of the switch element to maintain the AC input current proportional to the AC input voltage.

Li, U.S. Pat. No. 7,359,224, discloses a circuit for providing power factor correction in accordance with an embodiment of the present application which may include a boost converter circuit and a control circuit receiving as inputs; a rectified AC input voltage from a rectifier, a signal proportional to current through the boost inductor and the DC bus voltage across the capacitor of the boost converter. The control circuit provides a pulse width modulated signal to control the on time of a PFC switch. The control circuit further includes a voltage regulator and a current regulator. The current regulator includes a difference device operable to subtract a signal proportional to the inductor current from the current reference signal, a PI controller adapted to receive the output of the difference device and provide a first control signal, a feed forward device operable to receive the rectified AC input voltage and to provide a second control signal with a smaller dynamic range than the AC input voltage, and an adder operable to add the first control signal to the second control signal to provide a PWM reference signal for generating the pulse width modulated signal. A zero crossing detector and vector rotator may be provided to provide a clean sinusoidal reference to the current regulator. A partial PFC regulator may be provide to provide partial mode PFC if desired.

Shteynberg et al, U.S. Pat. No. 7,149,097, discloses a switch mode AC/DC converter with input current shaped for unity power factor. Input current is modulated by input voltage, an input inductor and an isolation transformer driven with the same duty ratio, with a low voltage across a bulk capacitor. This voltage is determined only by input voltage amplitude. Energy stored in a leakage inductance of the transformer is returned back to the internal DC source. A soft switching circuit is connected to the primary side, eliminating the need for high side drive. Sources of the main and auxiliary switches and primary winding of the transformer are connected to ground for easy primary voltage sensing. Overvoltage protection circuit of the output is connected to exclusively primary side signals. Secondary synchronous rectifier is driven by a circuit synchronized with the system clock. The circuit can be coupled to either the primary or the secondary winding of the isolation transformer.

Acatrinei, US application 2005/0212501, discloses a low cost high performances power factor correction method, system and apparatus, comprising an AC power source able to provide a low frequency supply signal, a low frequency pass filter circuit able to protect the power source against reverse high frequency signal noise, a rectifier circuit able to provide a fully rectified low frequency supply signal, a high frequency DC/DC converter circuit able to convert the fully rectified low frequency supply signal into a rectified high frequency supply signal having the capability to absorb and deliver at any moment a current amount contingent and linearly proportional in amplitude to its supply voltage amount and/or its driving pulses duty cycle ratio, a small signal controller circuit able to control the converter circuit and a complex load circuit including at least one capacitor able to store the rectified high frequency supply signal, so the small signal controller circuit controls the large signal converter circuit by means of a pulse width modulation driving signal consisting of trains of pulses constant in frequency and duty cycle during a period of time equal or longer than one of the AC power source supply signal semi-cycle period so during each the supply signal's semi-cycle period, as long as the controlling pulse is constant, the current amount absorbed by the large signal circuit from the AC power source is contingent and linearly proportional to the AC power source's voltage amount only, so the AC power source's output current and voltage amount follows an identical graphic shape and so the energy transfer's power factor parameter of the AC power source and the complex load system is improved to near unity.

The related art described above discloses circuits using sample-hold technique for power factor correction in a power system. However, the present invention using a sample and hold circuit that distinguishes over the prior art providing heretofore unknown advantages as described in the following summary. In the present AC electrical system a source produces an input voltage and current. The source is interconnected through an energy storage device with a load across which an output voltage appears, and a unity power factor control circuit is operated according to a method for maintaining unity power factor. This method comprises the steps of producing a sample and hold voltage derived from the input voltage and the output voltage wherein the sample and hold voltage maintains constant values between pulses of a clock signal. A modulated signal is turned on at each clock pulse fall. Sampling of the input voltage is initiated each time the clock signal turns on and holds the input voltage when the clock signal turns off. The held voltage value continues to be held until a current feedback voltage equals the held voltage whereupon the modulated signal turns off thereby drawing the input voltage and the input current into phase over a plurality of cycles of the clock signal.

BRIEF SUMMARY OF THE INVENTION

This disclosure teaches certain benefits in construction and use which give rise to the objectives described below.

A power factor correction method uses a sample and hold circuit to take timed samples of a source or "mains" voltage in accordance with a pulse width modulator. The resultant signals of the sample and hold circuit are processed through a further logic circuit to correct the phase angle between the voltage and current waveforms of the mains.

A primary objective inherent in the above described apparatus and method of use is to provide advantages not taught by the prior art.

Another objective is to reduce power loss by maintaining unity power factor.

A further objective is to provide a power factor correction circuit that can be implemented at low cost.

A further objective is to provide such a circuit that can be implemented using either a hard wired circuit or a software enablement.

A further objective is to provide such a circuit that is able to bring power factor in a AC system close to unity quickly.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention in such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Figure 1:
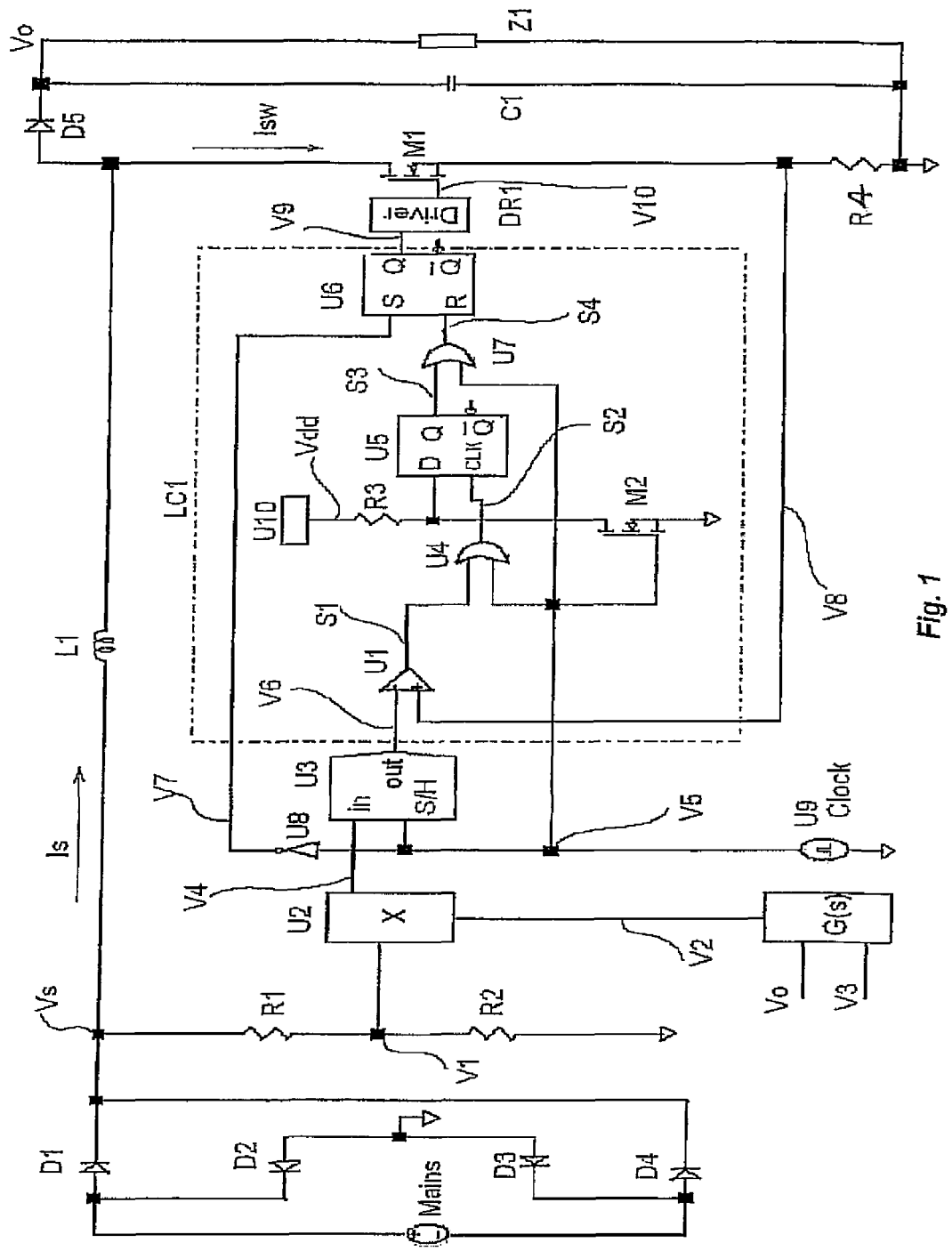
FIG. 1 is an electrical schematic diagram of a power factor correction circuit according to the presently described invention.
Figure 5:
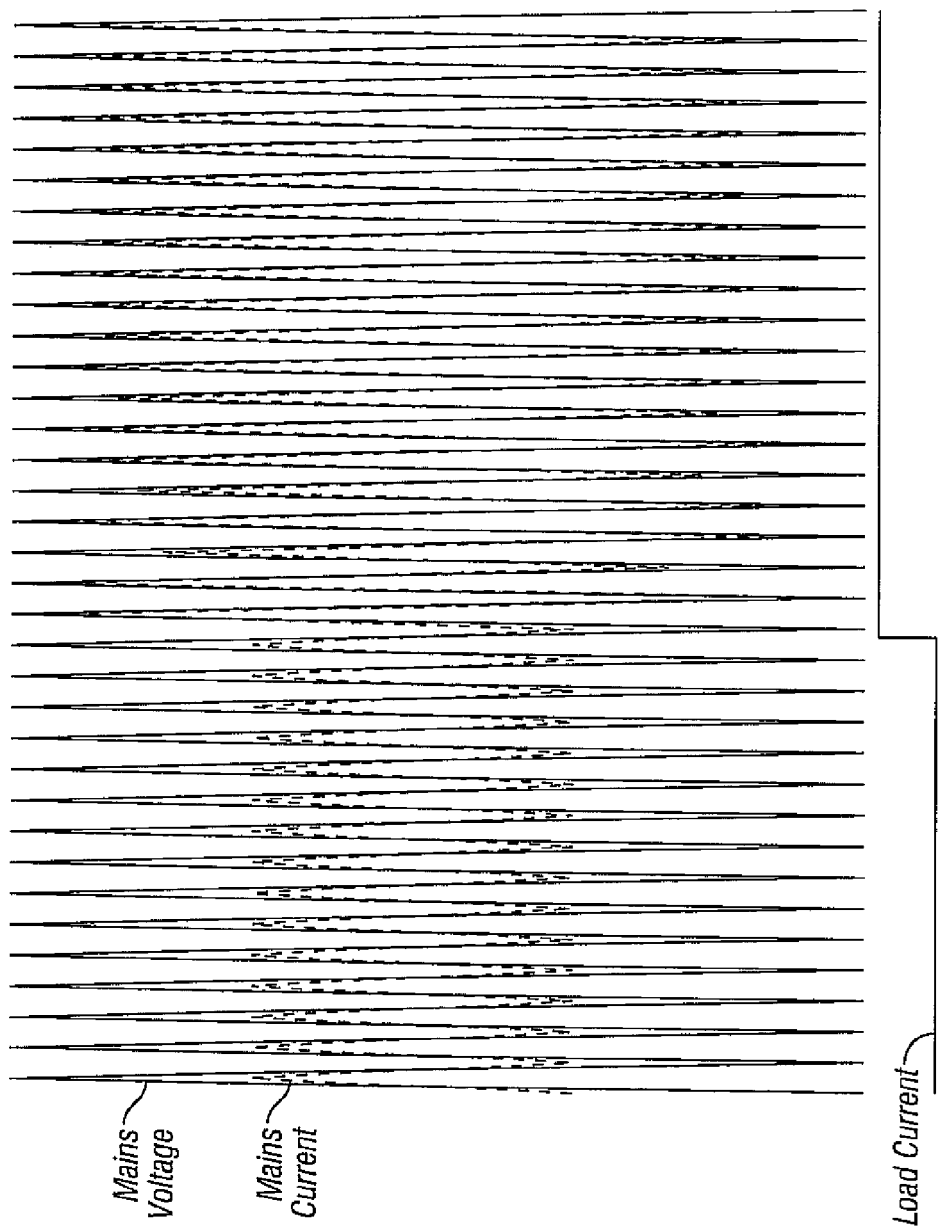
FIG. 5 is a waveform chart showing mains voltage and current at unity power factor and their responses with respect to the step change of the load current.
Figure 6:
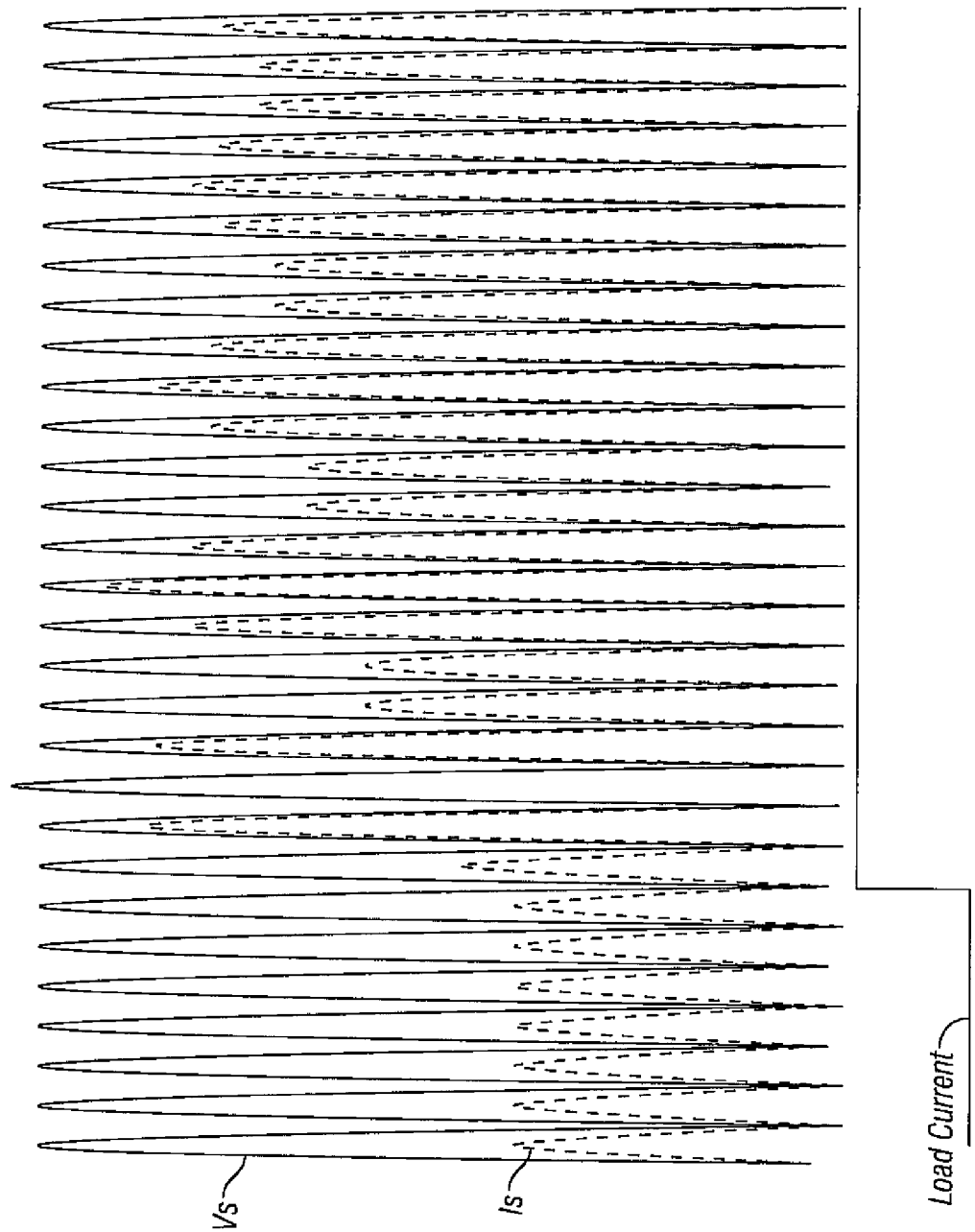
FIG. 6 is a waveform chart similar to FIG. 5 but showing a takeoff of the voltage and current as full-wave rectified waveforms.

Described herein is a power distribution system incorporating a preferred power factor correction (PFC) circuit as shown in FIG. 1. Described also, is a method of its use for power factor correction. The power distribution system per se, comprises a sinusoidal power supply, referred to herein as a "mains" which drives load Z1 through an energy storage device such as inductance L1. In the present embodiment, the mains voltage and current are full sinusoids as shown in FIG. 5, wherein mains voltage is pinned and mains current varies in accordance with load demand as shown by the load current signal shown at the bottom of FIG. 5. In the present description, supply voltage Vs and supply current Is are shown as full wave rectified signals in FIG. 6 due to bridge circuit D1, D2, D3 and D4. The PFC circuit is energized by input voltage V1 derived from a voltage divider circuit R1 and R2 as would be necessary when supply voltage Vs is large.

Figure 3:
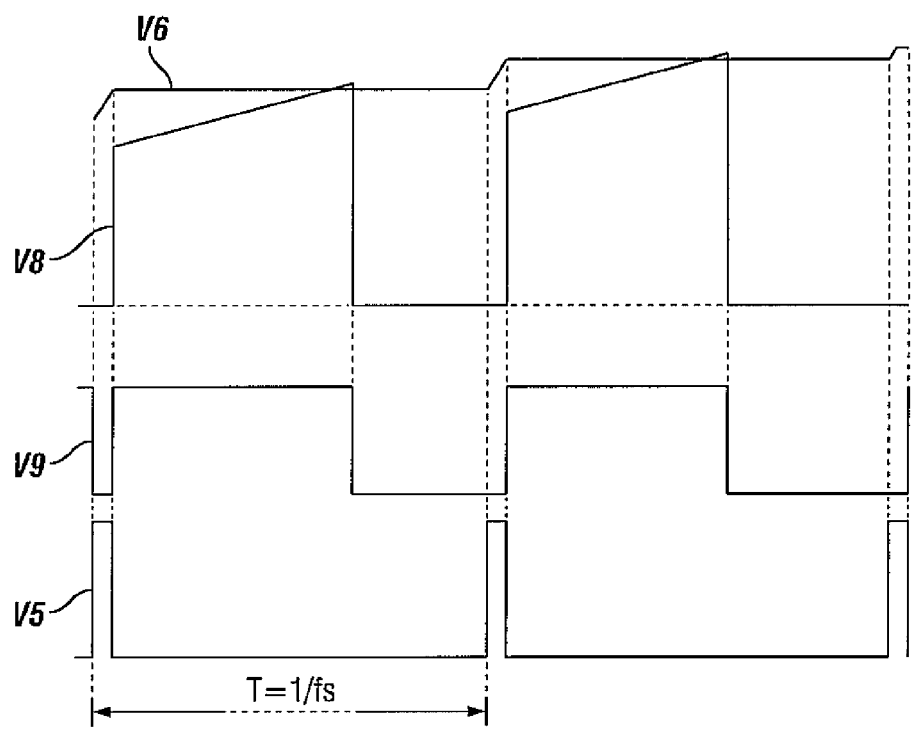
FIG. 3 is a waveform chart showing line voltage and current and digital waveforms for control signals.

The method of this invention is summarized in the waveform diagram of FIG. 3 which show the relationship between V5, V6, V8 and V9. At the bottom of the diagram we see a clock signal V5 which has a fixed time sequence of pulses with cycle time T, the inverse of the fixed clock frequency fs. At the top of the diagram is sample and hold voltage V6. As shown, V6 is held constant between consecutive pulses of V5, that is, during the time when clock signal V5 is zero. Modulated signal V9 is a pulse width modulated signal controlled by V8 and |V8| grows linearly in magnitude until it equals |V6| whereupon it drops to zero. These relationships and their method of controlling power factor will be described below.

Referring now to FIG. 1, this circuit provides an output voltage Vo which is combined with a reference voltage V3 in a feedback compensator G(s) to produce a resultant voltage V2 which is proportional to Vo so as to provide a current reference voltage V4 through the multiplier U2, that is, as multiplied by V1. V1 and V2 are multiplied producing the current reference voltage V4. The clock circuit U9 produces a clock pulse signal V5, as described above, which is a time sequence of on-state pulses; see FIG. 3. A sample and hold circuit U3, driven by clock signal V5 samples the value of current reference voltage V4 at each on-state of V5 thereby producing the sample and hold voltage V6.

Figure 2:
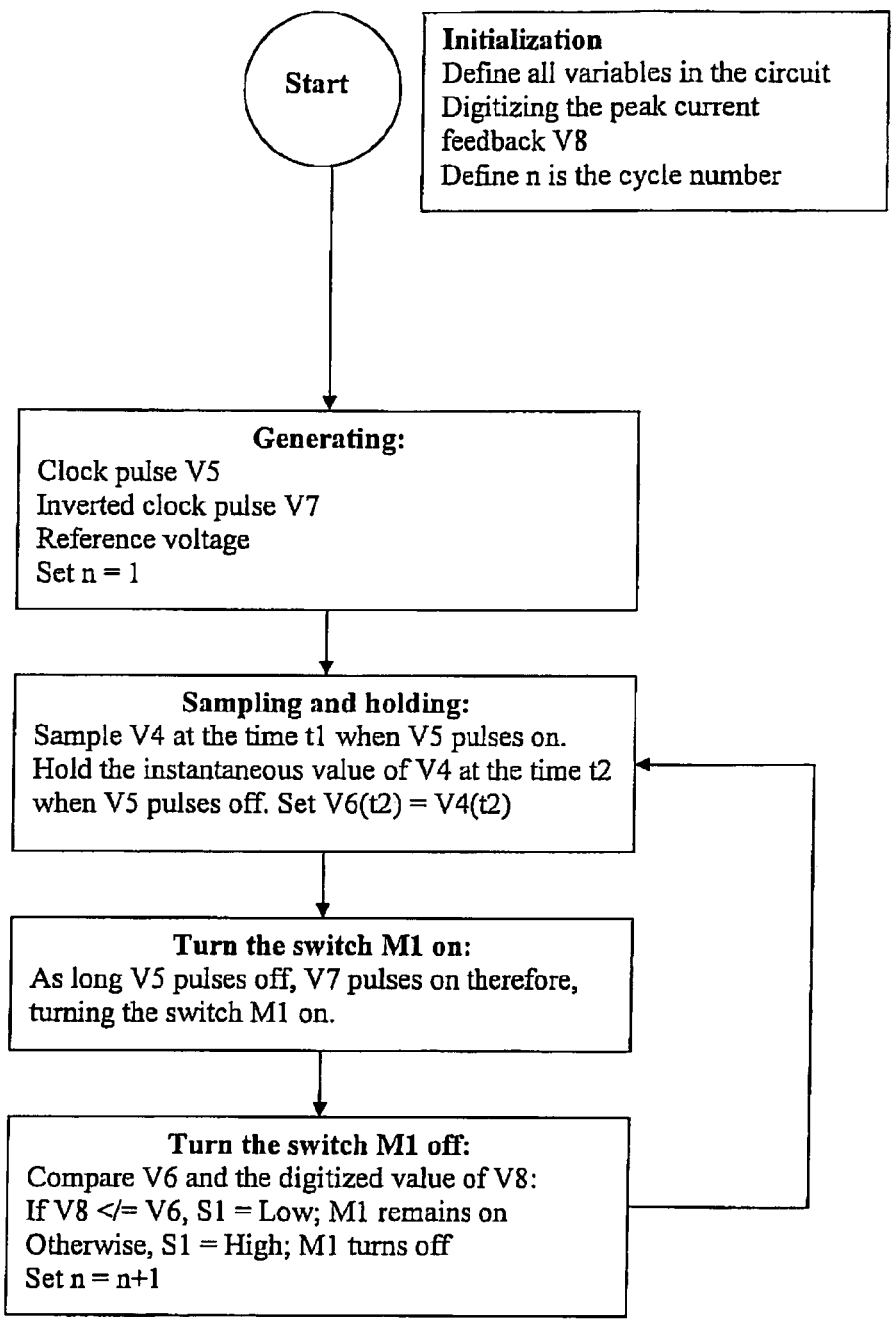
FIG. 2 is a logic flow diagram of a logic portion thereof.

In one embodiment of the present method, and as shown in FIG. 1, four voltages are provided to logic circuit LC1 including: sample and hold voltage V6, clock pulse signal V5, inverted clock pulse signal V7, which is the output signal of inverter U8, and current to sensing voltage V8. In a further embodiment, the logic function of LC1 may be alternately implemented by a software program as shown in FIG. 2.

The output of LC1 is the modulated signal V9 with is a pulse width modulated signal delivered to a gate driver DR1. DR1 delivers a driver signal V10 to a first switch M1. First switch M1 is closed each time inverted clock pulse signal V7 is high, i.e., when clock circuit U9 turns off During the time that first switch M1 is closed, V8 rises linearly (see FIG. 3) and in proportion to the current flowing through sensing resistor R4. M1 remains closed until V8 rises above the level of V6, the sample and hold voltage, whereupon M1 opens and V8 drops to zero.

During the time first switch M1 is closed, energy storage device L1 stores energy. When M1 opens the energy stored in L1 is delivered to the load Z1 through diode D5. A capacitance C1 may be placed across load Z1 in order to store energy and also to reduce voltage ripple across load Z1.

First switch M1 opens and closes in a series of cycles which draws Vs and Is into phase over a few cycles of the clock signal V5 which is a small fraction of a cycle of the mains voltage. Therefore, as long as the present inventive circuit is operational with the mains voltage Vs and the load Z1, the power factor will effectively be unity. This is true in that when the power factor tends to instantaneously drop below unity, Vo also tends to drop and V4 and V6 will tend to increase proportionately as V8 rises which causes the duty cycle of DR1 to increase. Therefore, the average current through M1 increases which means that the energy stored in L1 increases. Each time M1 opens the energy in L1 is delivered to Z1 and C1. Thus, by changing the duty cycle of DR1 in this manner, power factor is maintained at unity.

Figure 4:
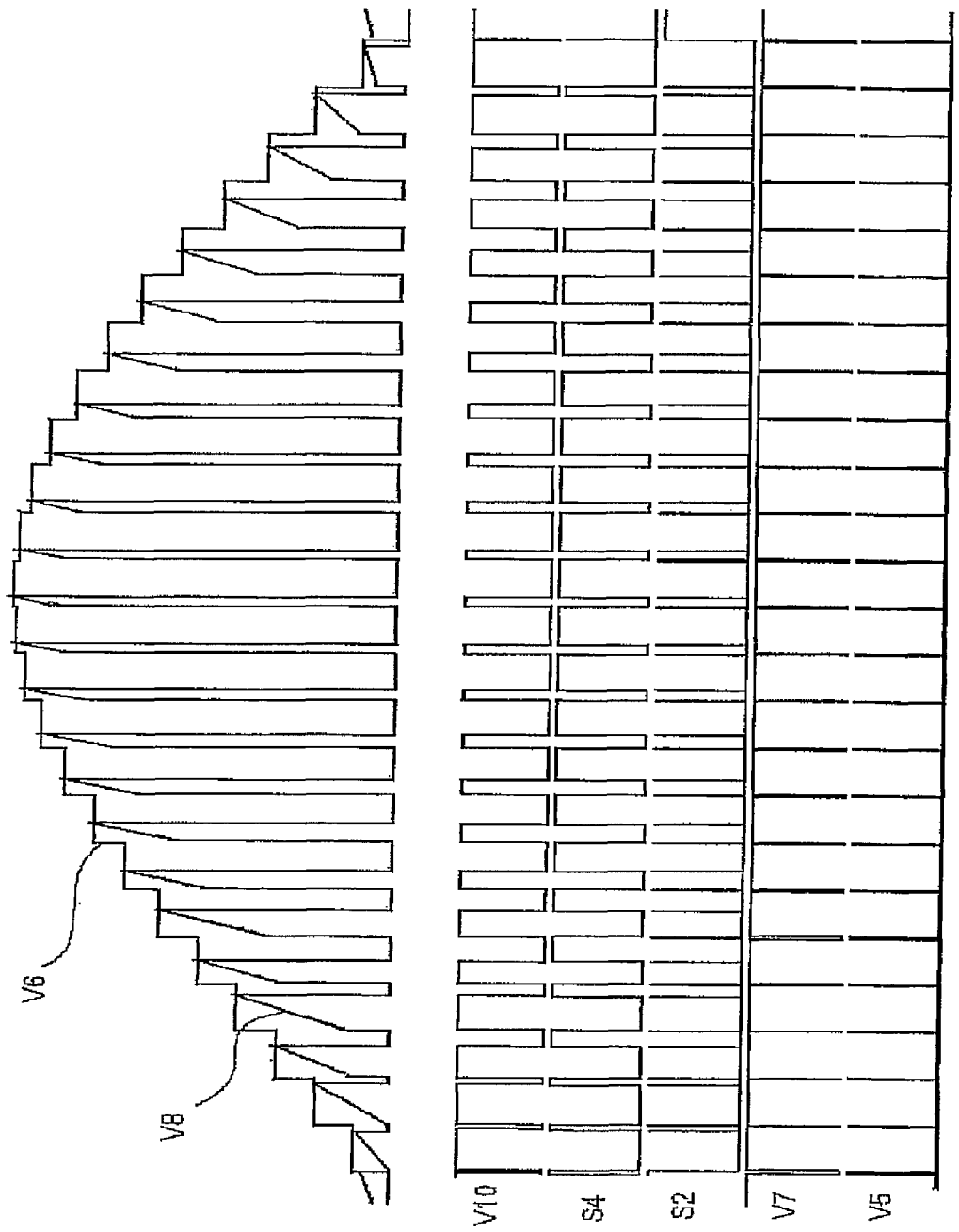
FIG. 4 is a waveform chart showing how power factor is controlled.

In FIG. 4 the horizontal axis is time and the vertical axis shows the on/off sense and voltage magnitude of several operational signals. At the bottom of this waveform chart we see V5 the clock pulse waveform and above it is shown the inverse waveform of V7. Above this is shown the waveforms of S2, S4 and V10. FIG. 1 identifies these points in the circuit diagram. Above the waveform chart for V10 we see the time based waveforms for voltages V6 and V8. During each clock cycle, defined by V6, voltage V8 ramps linearly until it equals voltage V6 whereupon V8 drops to zero for the remainder of the cycle.

The above described circuit and method is wholly applicable to a single or multiphase system.

In FIG. 1, LC1 shows a hardware enablement of the logic circuit of the invention. Here we see that comparator U1 receives V6 and V8 and its output S1 is high when V8 is greater than V6. OR gate U4 receives S1 and V5 and its output S2 is high when either, or both, S1 and V5 are present. Comparator U1 receives V6 and V8 and its output S1 is high when V8 is greater than V6. Digital power supply U10 provides voltage Vdd across resistor R3 to pull down input D of the D-flip-flop U5 when the V5 pulse of clock U9 switches M2 on. At that instant U5 is reset and the output S3 is low. S4 is high during the V5 pulse which resets RS-flip-flop U6. This drives V9 low and driver DR1 opens switch M1. After each V5 pulse, V7 goes high which forces the output V9 of U6 high and V10 of driver DR1 closes switch M1. At this time a switch current Isw flows across switch M1 and through R4. Voltage V8 is the product of current Isw and the value of resistor R4. As previously described if V8 is greater than V6 then M1 opens for the rest of the cycle of clock U9. If, however, V8 is less than V6, then M1 remains closed until V8 is greater than V6.

In FIG. 2 a software enablement is described which may be used to replace LC1. Here, software values are assigned to the variables and associated with LC1 and the value of "n" is assigned as a cycle number. These values include clock pulse V5, inverted clock pulse V7, the reference voltage V3 and n is set to unity. The sample and hold voltage V4 is assumed to be zero at time t1 when a pulse of clock signal V5 appears. V4 is held constant when V5 is off so that V6 equals V4 at a time t2. As long as V5 is off, V7 is on and switch M1 closes. V8 and V6 are compared and when V8 is less than V6, M1 closes, otherwise M1 opens and n is incremented to n+1. This cycle is repeated starting with the sampling function.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. In an AC electrical system having a source producing a sinusoidal source voltage (Vs) and an sinusoidal source current (Is), the source interconnected through an energy storage device (L1) with a load (Z1), and a unity power factor control circuit; a method for maintaining unity power factor, comprising the steps of:

producing a sample and hold voltage (V6) related to both an input voltage (V1) and an output voltage (Vo) wherein the sample and hold voltage (V6) maintains a constant value between pulses of a clock signal (V5), that is, while the clock signal (V5) is low;

turning on a modulated signal (V9) each time the clock signal (V5) assumes the low value thereby producing a current feedback voltage (V8) proportional to the source current (Is);

storing energy in the energy storage device (L1) while the sample and hold voltage (V6) is greater than the current feedback voltage (V8);

delivering the source current (Is) and energy stored in the energy storage device (L1) to the load (Z1) each time the current feedback voltage (V8) exceeds the sample and hold voltage (V6); whereby controlling the amount of energy that is stored in energy storage device (L1), the source voltage (Vs) and the source current (Is) are drawn into phase.

2. The method of the AC electrical system of claim 1 further comprising the step of storing energy in the energy storage device (L1) while the modulated signal (V9) is on, and releasing the stored energy to the load (Z1) when the modulated signal (V9) turns off.

3. The method of the AC electrical system of claim 1 further comprising the step of modulating modulated signal (V9) in pulse width modulation and controlling said modulation using a signal controlled by current feedback voltage (V8) thereby growing |V8| linearly in magnitude until it equals |V6| whereupon the current feedback voltage (V8) drops to zero.

4. The method of the AC electrical system of claim 1 further comprising the step of closing a first switch (M1) each time an inverted signal (V7) of clock pulse signal (V5) is high.

5. The method of the AC electrical system of claim 4 further comprising the step of linearly raising current feedback voltage (V8) during the time that the first switch (M1) is closed, wherein current feedback voltage (V8) is proportional to a switch current (Isw) in sensing resistor (R4).

6. The method of the AC electrical system of claim 4 further comprising the step of inputting the sample and hold voltage (V6), the clock pulse signal (V5), the inverted signal (V7) and the current feedback voltage (V8) to a logic circuit LC1, wherein, logic circuit (LC1) produces the modulated signal (V9).

7. The method of the AC electrical system of claim 6 further comprising the steps of delivering the modulated signal (V9) to a driver (DR1), and thereby delivering a driver signal (V10) to the first switch (M1), thereby closing the first switch (M1) each time the inverted signal (V7) goes high.

8. The method of the AC electrical system of claim 6 wherein the logic circuit (LC1) has a comparator (U1) receiving the sample and hold voltage (V6) and the current feedback voltage (V8), and wherein an output (S1) of comparator (U1) is high when current feedback voltage (V8) is greater than sample and hold voltage (V6), wherein an OR gate (U4) receives output (S1) and clock signal (V5) thereby driving signal (S2) of OR gate (U4) high when either, or both, the output (S1) and the clock signal (V5) are present, wherein a digital power supply (U10) provides a voltage (Vdd) across a second resistor (R3) thereby pulling down a D-input of a D-flip-flop (U5) when the clock signal (V5) turns on a second switch (M2) and, at that instant resetting the D-flip-flop (U5) and resetting a D-flip-flop output (S3) to low, and setting an output (S4) of an OR gate (U7) high during each pulse of the clock signal (V5) thereby resetting an RS-flip-flop (U6) and thereby driving modulated signal (V9) low so that the driver (DR1) opens the first switch (M1).

9. The method of the AC electrical system of claim 8 further comprising the step of forcing the modulated signal (V9) of to go high when after each pulse of clock signal (V5) the inverted clock pulse signal (V7) goes high thereby closing first switch (M1) thereby enabling a switch current (Isw) in resistor (R4) thereby producing current feedback voltage (V8) as the product of switch current (Isw) and the value of resistor (R4).

10. The method of the AC electrical system of claim 1 further comprising the steps of combining the output voltage (Vo) with a reference voltage (V3) to produce a resultant voltage (V2); multiplying input voltage (V1) and the resultant voltage (V2) to produce a current reference voltage (V4), wherein, the current reference voltage (V4) is sampled at each clock pulse thereby producing the sample and hold voltage (V6).

11. The method of the AC electrical system of claim 1 further comprising the steps of increasing the value of the current feedback voltage (V8) in proportion to the switch current (Isw) flowing through a sensing resistor (R4) during the time that a first switch (M1) is closed, and maintaining the first switch (M1) closed until the value of the current feedback voltage (V8) exceeds the value of the sample and hold voltage (V6), and then opening the first switch (M1) thereby dropping the value of the current feedback voltage (V8) to zero.

12. The method of the AC electrical system of claim 1 further comprising the step of storing energy in the energy storage device (L1) during the time a first switch (M1) is closed, and delivering energy stored in the energy storage device (L1) to the load (Z1) through a diode (D5) when the first switch (M1) opens.

13. The method of the AC electrical system of claim 1 further comprising the step of inserting a capacitor (C1) across the load (Z1) thereby storing energy in the capacitor (C1) and reducing ripple in the output voltage (Vo) across load (Z1).

14. The method of the AC electrical system of claim 1 further comprising the step of repeatedly opening and closing a first switch (M1) in a series of cycles thereby drawing the source voltage (Vs) and the source current (Is) into phase over a few cycles of the clock signal (V5).

15. The method of the AC electrical system of claim 14, further comprising the steps of changing the duty cycle of a driver (DR1) in response to the change in the current feedback voltage (V8) thereby varying the average current through the first switch (M1) and thereby varying the average energy stored in the energy storage device (L1) and thereby maintaining a unity power factor in the electric system.

16. The method of the AC electrical system of claim 1 further comprising the step of sampling values of the current reference voltage (V4), the sample and hold voltage (V6), the clock pulse signal (V5), an inverted signal (V7) of clock pulse signal (V5), and the current feedback voltage (V8) and assigning said values as software variables simulating said sampling values; and comprising the further step of providing a software integer "n" as a cycle number, "n" having an initial value of one (1), and simulating the current reference voltage (V4) at a simulated time t1 when a sampled value of a pulse of clock signal (V5) appears and holding the simulated current reference voltage (V4) constant, whereby sampling value of the sample and hold voltage (V6) equals the simulated current reference voltage (V4) at a subsequent time t2, and as long as the simulated clock signal (V5) is low, simulated inverse clock signal (V7) is high and a simulated first switch (M1) closes.

17. The method of the AC electrical system of claim 16 further comprising simulating a comparison of the current feedback voltage (V8) with simulated sample and hold voltage (V6); and when simulated current feedback voltage (V8) is less than or equal to simulated sample and hold voltage (V6), holding simulated first switch (M1) in a simulated on state, and otherwise simulating turning off first switch (M1) and incrementing variable n and repeating the simulation starting with the sampling function.

* * * * *